United States Patent
Pond

[11] 3,710,754
[45] Jan. 16, 1973

[54] BREAD SLICE COATING APPLICATOR

[76] Inventor: John E. Pond, 17238 Barneston, Granada Hills, Calif. 91344

[22] Filed: March 12, 1971

[21] Appl. No.: 123,607

[52] U.S. Cl. ..................118/13, 118/247, 118/261
[51] Int. Cl. ...............................................B05c 1/02
[58] Field of Search......107/1 B, 1 F; 118/24, 25, 13, 118/247, 259, 261

[56] References Cited

UNITED STATES PATENTS

| | | | |
|---|---|---|---|
| 2,130,786 | 9/1938 | Bergstein | 118/247 X |
| 2,182,068 | 12/1939 | Clark | 118/13 |
| 2,851,003 | 9/1958 | Binstead et al. | 118/13 |
| 2,923,257 | 2/1960 | Monaco | 118/25 UX |
| 3,119,352 | 1/1964 | Fay | 118/25 UX |
| 3,340,824 | 9/1967 | Talbot | 118/25 X |

FOREIGN PATENTS OR APPLICATIONS 363,246    4/1906    France ....................118/25

Primary Examiner—John P. McIntosh
Attorney—Lyon & Lyon

[57] ABSTRACT

An applicator for automatically applying a coating of butter, mayonnaise, or other relatively soft material on slices of bread which are carried in sequence by a conveyor belt under the applicator. The applicator includes a perforated applicator cylinder having an internal screw conveyor which distributes the coating material, supplied from a reservoir, along the external surface of the applicator cylinder. An adjustable doctor blade removes excess coating material from the applicator cylinder. The applicator cylinder turns in opposite direction to the movement of the bread so that the coating material is wiped from the surface of the applicator cylinder. The width of the perforated portion of the applicator cylinder is less than the width of the bread and the applicator cylinder is movable to and from the bread in timed relation to the movement of the bread so that the coating terminates short of the edges of the bread to form a coating free margin.

6 Claims, 11 Drawing Figures

PATENTED JAN 16 1973 3,710,754

INVENTOR
JOHN E. POND
BY
*Lyon+Lyon*
ATTORNEYS

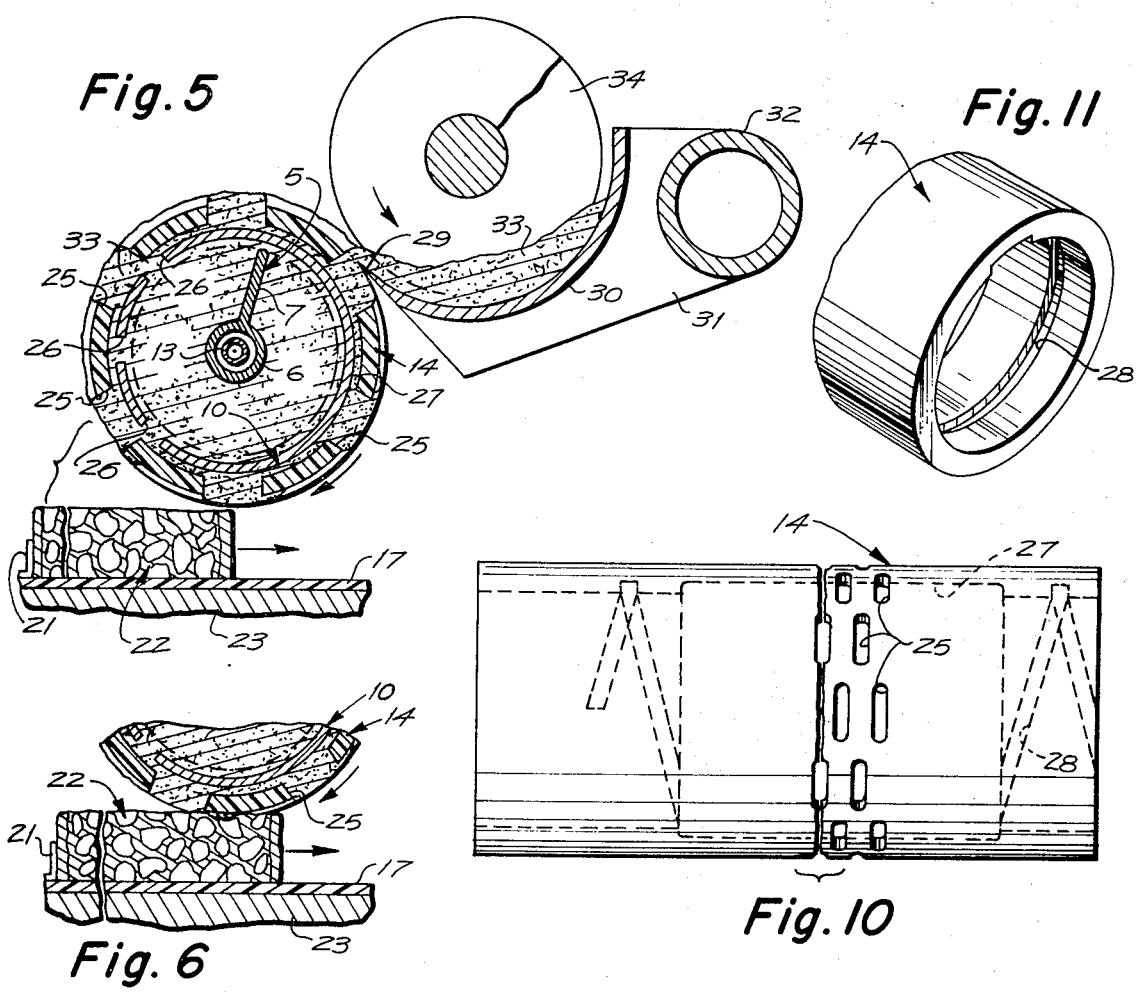
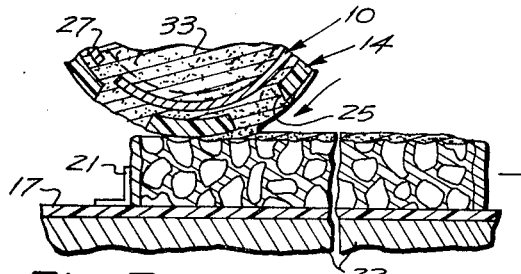
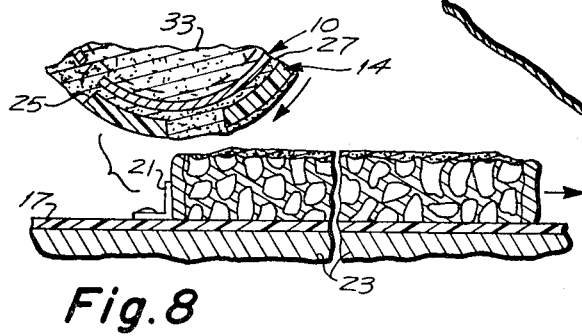
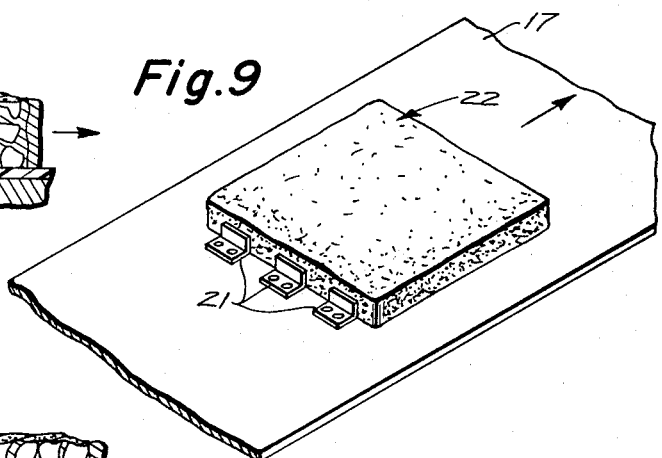
Fig. 5
Fig. 11
Fig. 6
Fig. 10
Fig. 7
Fig. 9
Fig. 8
INVENTOR
JOHN E. POND
BY
ATTORNEYS

BREAD SLICE COATING APPLICATOR

BACKGROUND OF THE INVENTION

The present invention is directed to a bread coating apparatus; that is, to an apparatus which automatically applies a coating such as butter to a slice of bread, the apparatus forming part of an automatic machine capable of preparing and wrapping complete sandwiches. Sandwiches have become an important and convenient source of food; however, at present, the cost of preparation which is performed manually is often much higher than the cost of the ingredients.

A major cost in the present manual preparation of a sandwich is the spreading of butter, mayonnaise, jelly, peanut butter or other coating on either or both bread slices. This is done with a knife or spatula. The amount of material applied varies substantially, not only from sandwich to sandwich, but also between persons performing the sandwich making operations. Also, some of the coating is wasted on the edges of the bread, creating the further problem in that the resulting sandwich may be messy to handle.

SUMMARY OF THE INVENTION

The present invention is directed to an apparatus for automating the step of coating bread slices and is summarized in the following objects:

First, to provide a bread slice coating applicator which is automatic as well as rapid in operation, and which is arranged to apply a coating of uniform thickness in such a manner as to provide an uncoated margin of predetermined width around the periphery of the bread slice, thereby minimizing waste of coating material and ensuring a neat and attractive sandwich.

Second, to provide a bread slice coating applicator, wherein the coating material is extruded radially from a cylindrical applicator having a surface offering minimal bond to the coating material whereby on wiping the applicator against the surface of a bread slice, the coating adheres to the bread and strips from the applicator.

Third, to provide a bread slice coating applicator, which includes a rotatable cylindrical coating member having a plurality of extrusion openings uniformly distributed about its periphery; the coating member surrounding a control sleeve having openings occupying a predetermined portion of its periphery so that extrusion from the coating member is restricted to a corresponding portion of its periphery; the timing of the coating member with respect to the movement of bread past the coating member is such that extrusion does not occur in the region presented to the bread thereby ensuring a uniform coating.

Fourth, to provide a bread slice coating applicator, wherein the bread slice is raised into engagement with the applicator cylinder and lowered therefrom to control the region of coating applied longitudinally of the direction of travel, and the width of the extrusion area determines the width of the coating area.

Fifth, to provide a bread slice coating applicator, wherein the thickness of the coating may be adjusted.

DESCRIPTION OF THE DRAWINGS

FIG. 5 is a further enlarged fragmentary sectional view, taken through 5—5 of FIG. 4, showing the manner in which the coating or spreadable material is extruded from the applicator member, the parts being in the position assumed between the coating operation.

FIG. 6 is a similar but more restricted fragmentary sectional view, showing the coating cylinder when first contacted by a slice of bread.

FIG. 7 is a similar fragmentary sectional view, showing the applicator as it completes its coating operation.

FIG. 8 is a similar view, showing the applicator clearing a slice of bread upon completion of the coating operation.

FIG. 9 is a fragmentary perspective view, showing a slice of bread and adjacent portions of the conveyor belt.

FIG. 10 is a fragmentary plan view of the coating or applicator cylinder.

FIG. 11 is a fragmentary perspective view, showing one end thereof.

Figure 1:
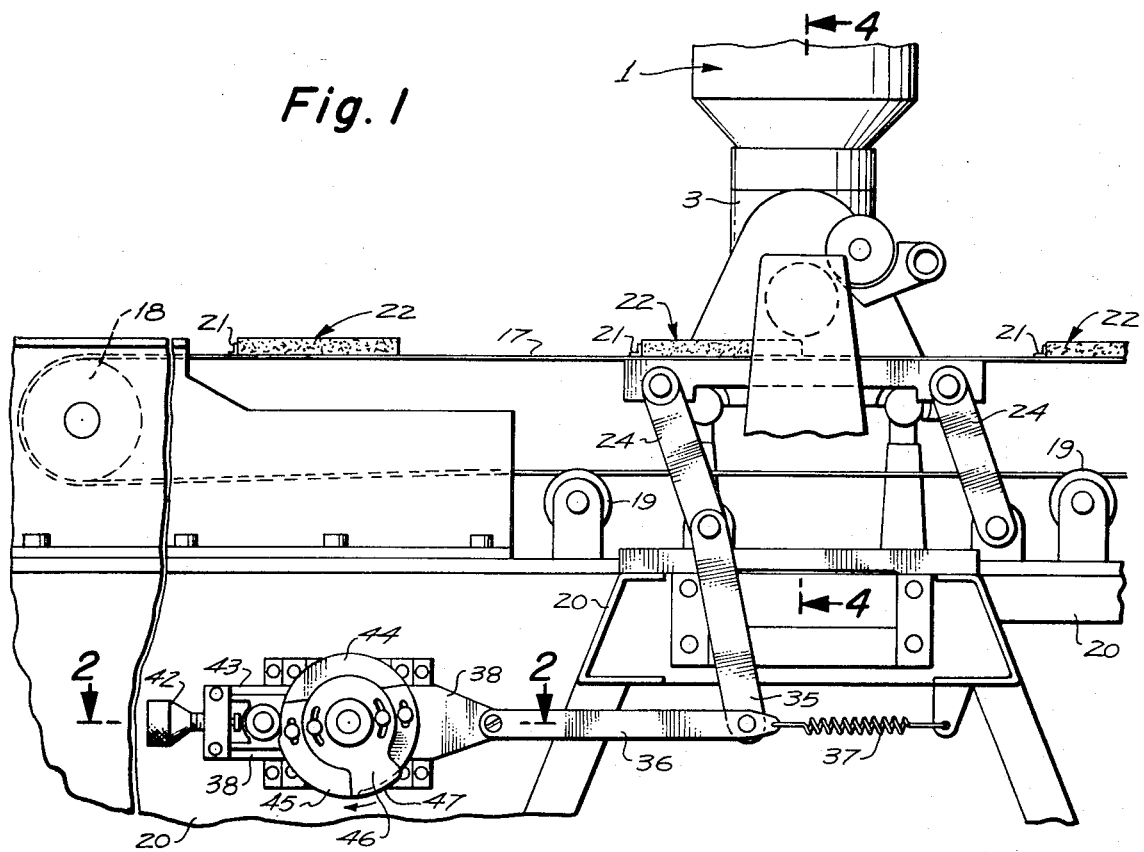
FIG. 1 is a fragmentary side view, showing the bread conveyor and the means for raising and lowering the conveyor for the purpose of applying a coating to a slice of bread.
Figure 2:
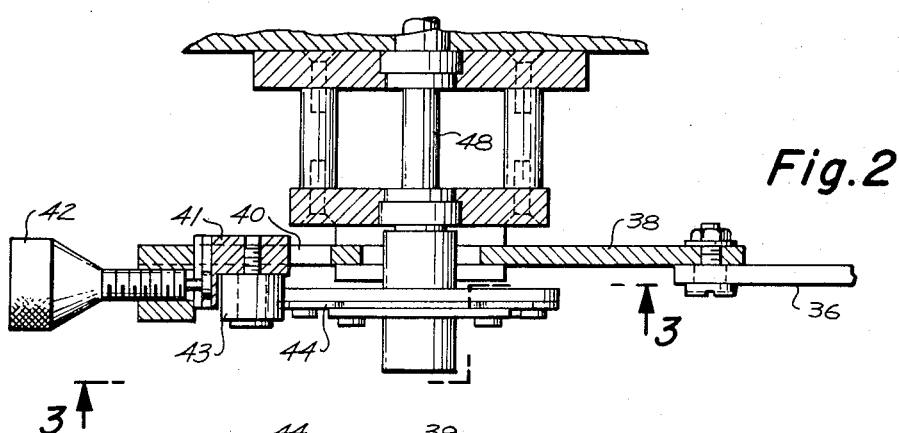
FIG. 2 is an enlarged fragmentary sectional view, taken through 2—2 of FIG. 1, showing the drive mechanism for raising and lowering the bread slices.
Figure 3:
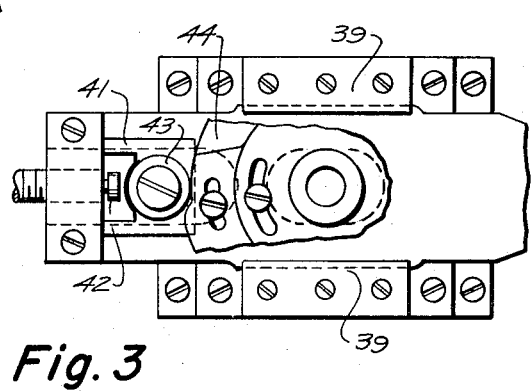
FIG. 3 is a fragmentary side view thereof, taken from 3—3 of FIG. 2.
Figure 4:
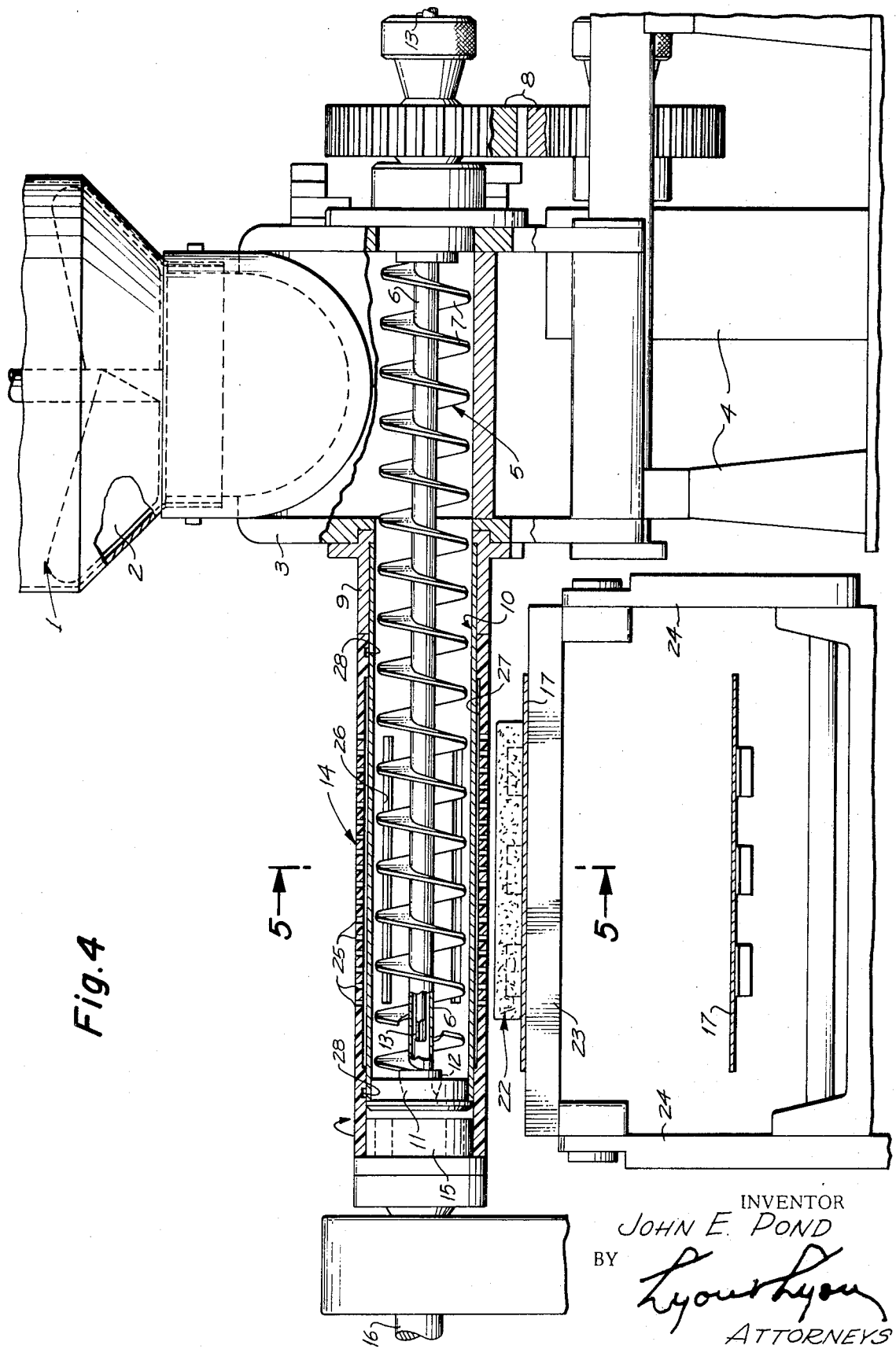
FIG. 4 is an enlarged fragmentary partial sectional, partial side view, showing the coating applicator mechanism, the section being taken through 4—4 of FIG. 1.

The bread slice coating applicator includes a reservoir 1, intended to contain butter, mayonnaise, peanut butter, jams, jellys or other spreadable material which might be applied to a slice of bread. The reservoir contains stirring paddles 2. The reservoir includes a base portion 3, shown particularly in FIG. 4, supported by suitable framework 4.

The bottom of the base portion 3 is semi-cylindrical to receive a screw conveyor 5, which includes a tubular shaft 6 and a helical blade 7. One end of the shaft 6 protrudes from one end of the base portion 3 and is connected through suitable drive gears 8 to a power source, not shown.

The opposite end of the base portion 3 is provided with an opening surrounding the screw conveyor 5 from which extends a horizontal mounting collar 9. The mounting collar receives a cylindrical sleeve 10, the extended end of which is provided with a bearing disk 11, arranged to receive a conical end bearing 12 provided at the corresponding end of the shaft 6. As it is desirable to maintain the spreadable material at a proper temperature to permit spreading of the material onto a slice of bread, the tubular shaft 6 and the surrounding material may be heated by means of a heating fluid supplied through a tube 13 provided within the tubular shaft 6.

The sleeve 10 is fixed against rotation and mounted thereon is an applicator cylinder 14, one end of which abuts the mounting collar 9, and the other, or extended end of which is provided with a closure 15 which is connected to a drive shaft 16 connected to a driving means, not shown.

Positioned under the applicator cylinder 14 is a conveyor belt 17, supported by end rollers, one end roller 18 of which is shown, and suitable conventional idler rollers 19. The rollers are supported by framework 20, indicated fragmentarily. The conveyor belt 17 and the end roller 18 are provided, respectively, with driving and timing slots and sprocket teeth, not shown, so that the timing of the conveyor belt 17 may be controlled.

The conveyor belt 17 is provided with sets of spaced cleats 21, adapted to engage bread slices 22. The dimensions of the bread slices are predetermined; that is, they are of uniform thickness as well as uniform width and length. Preferably, the bread slices are square. They are deposited on the conveyor belt 17 by suitable mechanism, not shown, in such a manner as to occupy a predetermined position with respect to the edges of the belt. Each slice is engaged by a set of cleats 21, and are spaced by the cleats a predetermined distance.

Under the region below the applicator cylinder 14 and a distance either side thereof, approximating twice the length of the bread slice 22, is a positioning plate 23, which is supported from the framework 4, or other framework, by a set of linkages 24. The linkages are pivotally connected to the framework and to the corners of the positioning plate 23 so that as the linkages are tilted the positioning plate 23 is raised or lowered. The positioning plate 23 engages the upper reach of the belt 17 so as to raise a slice of bread positioned thereover into contact with the applicator cylinder 14, or to retract the bread slice from the applicator cylinder.

The applicator cylinder is provided with a zone of extrusion slots 25 equally spaced around the periphery of the applicator cylinder. The axial extent of the extrusion slots is slightly less than the width of the bread slice. The sleeve 10 is provided with a set of longitudinally extending extrusion slots 26, occupying approximately a 90° portion of the entire sleeve, so that 3/4 of the perimeter of the sleeve is solid; that is, without extrusion slots. The inner surface of the applicator cylinder is enlarged to form an annular space 27 overlying the slots 26. The axial extent of the space is greater than the zone occupied by the slots 25 and is intended to receive spreadable material from within the sleeve 10. In order to minimize escape of the material from the ends of the annular space 27, the ends of the applicator cylinder 14 may be provided with helical end channels 28 of opposite pitch.

The direction of rotation of the applicator cylinder 14 is opposite from the direction of movement of the bread slice, as indicated by the arrows in FIG. 5. The extrusion slots 26 in the sleeve are rotated along the upwardly moving side of the applicator cylinder 14. Located at the upper portion of the downward moving side of the applicator cylinder is a doctor blade 29, forming the leading edge of a semi-cylindrical channel member 30. The channel member is supported by one or more brackets 31 to a pivot mounting 32 so that the doctor blade 29 may be moved forward or away from the surface of the applicator cylinder 14, so that the spreading material 33 may be trimmed to a predetermined thickness. The excess spreading material is carried by a screw conveyor 34, operating in the channel member 30, to a suitable collector, not shown. From time to time, the collected material is returned to the reservoir 1.

In order to move the bread slices 22 to and from the applicator cylinder 14, the positioning plate 23 is raised and lowered. This is accomplished by an operating lever 35, attached to one of the linkages 24. The operating lever 35 is connected by a linkage 36, urged in one direction by a spring 37, and joined at its opposite end to a slide bar 38 mounted in guideways 39. The slide bar is provided with a slot 40, which receives a cam follower mounting block 41, adjustably positioned in the slot 40 by means of a screw 42.

The mounting block 41 carries a cam follower wheel 43, which engages a main cam disk 44, having a raised cam portion 45. Secured to the main cam disk 44 is an adjustable cam disk 46, also provided with a raised portion 47. The cam disk 46 is adjustable circumferentially so as to vary the combined extent of the raised portions 45 and 47. The cam disks are driven by a shaft 48, connected by a conventional chain or gear drive with the applicator cylinder 14. The conveyor belt is also connected by a conventional chain or gear drive to the applicator cylinder 14 so that the bread slices may be raised and lowered in timed relation with the rotation of the applicator cylinder.

Operation of the bread slice coating applicator is as follows:

The bread slices 22 are moved at a constant speed on the conveyor belt 17 and in predetermined spaced relation. Normally, the position of the positioning plate 23 is such that the bread slices clear the applicator cylinder 14. When the leading edge of a slice of bread passes under the applicator cylinder 14, it is raised into contact with the applicator cylinder. The timing is such that actual contact is made at a point inwardly from the leading edge of the slice of bread, as indicated in FIG. 6. As the slice of bread travels forwardly, the applicator cylinder 14 rotates in the opposite direction so that its surface wipes on the surface of the bread slice in the manner that a butter knife applies butter to a slice of bread; that is, the surface of the applicator cylinder 14 between the extrusion slots 25 spreads the spreading material 33 on the slice of bread. Essentially all of the spreading material which has protruded beyond the surface of the applicator cylinder is wiped onto the bread.

When the trailing edge of the slice of bread approaches the bottom of the applicator cylinder, the positioning plate 23 lowers the bread, as indicated by comparison with FIGS. 7 and 8. The timing is such that the trailing margin of the slice of bread is free of any coating.

In the upwardly moving region of the applicator cylinder, the spreading material is extruded from the interior of the sleeve 10 through the extrusion slots 26 into the space 27, from which it is further extruded through the slots 25. The spreading material flows radially from the slots 25 and increases in thickness on the surface of the applicator cylinder. Virtually all of the extrusion operation takes place in the upwardly traveling region of the applicator cylinder, as indicated in FIG. 5, and after passing beyond the slots 26, the protruding depth of the spreading material 33 tends to remain constant. If the feed rate determined by the screw conveyor 5 is precisely adjusted, then the protruding height of the spreading material 33 may be such that the doctor blade 29 is not needed. However, more precise projection of the spreading material may be attained by use of the doctor blade. It is desirable, of course, to adjust the operation so that only a minimal amount of spreading material 33 is removed to minimize the amount of the material collected and returned to the reservoir 1.

It is preferred to construct the applicator cylinder 14 of a plastic having a low coefficient of friction. An example of such material is carbon tetrafluoride, known commercially as Teflon.

It will be noted that the zone occupied by the slots 25 is slightly less than the width of the bread slice so that the side margins may be free of the spreading material 33. By proper adjustment of the cams 44 and 46, the leading margins and trailing margins may also be free of spreading material, yet the spreading material is uniformly distributed over the remaining portion of the bread slices. It is highly desirable that the margins of the bread slices be free of any coating, as it aids materially in the further handling of the bread slices, particularly by automatic means, in the course of producing a completed sandwich.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:

1. An apparatus for applying spreadable material to bread slices, comprising:
   a. a rotatable cylindrical applicator member having extrusion perforations uniformly distributed about its cylindrical surface corresponding in length to one dimension of a bread slice;
   b. means for forcing a spreadable material through the perforations until protruding from the surface of the applicator member;
   c. means for passing a slice of bread in tangential relation to and in wiping contact with the applicator member to transfer the spreadable material from the surface of the applicator member to the surface of the bread;
   d. means within the applicator member for restricting extrusion of the spreadable material to a predetermined fixed arc, whereby the spreadable material remains in as essentially constant protruding condition with respect to the applicator member throughout a complementary fixed arc;
   e. and means for effecting relative radial movement of the bread slice and applicator member to bring the bread slice into contact with the spreadable material while in its constant protruding condition.

2. An apparatus, as defined in claim 1, wherein:
   a. the width of the extrusion perforations are less than the width of the bread slice to leave uncoated the side margins of the bread;
   b. and the means for effecting relative movement of the bread slice and applicator member is timed with respect to the tangential movement of the bread slice to initiate mutual engagement inwardly from one end of the bread slice, and to terminate mutual engagement short of the other end of the bread slice to leave uncoated the end margins of the bread slice.

3. An apparatus, as defined in claim 1, which further comprises:
   a. a doctor blade operable in the region wherein the spreading material is in its essentially constant protruding condition to limit the protruding depth of the spreading material;
   b. and means for removing excess spreading material severed by the doctor blade.

4. An apparatus for applying spreadable material to bread slices, comprising:
   a. a fixed horizontal cylindrical sleeve closed at one end and having radially directed extrusion slots occupying a selected portion of its periphery, the complementary portion of the sleeve being solid;
   b. a rotatable applicator cylinder journalled in concentric spaced relation to the sleeve and including a uniformly perforated zone confronting the sleeve;
   c. means for forcing a spreadable material into the sleeve for extrusion through the sleeve slots into the space between the sleeve and cylinder and thereupon for extrusion through the perforations in the applicator cylinder for protrusion from the surface thereof, the protrusion depth of the spreadable material tending to remain constant throughout that portion of the applicator cylinder confronting the solid portion of the sleeve;
   d. a conveyor for passing slices of bread in sequence past the applicator cylinder in opposite direction to the direction of movement of the applicator cylinder;
   e. a plate larger than the bread slices disposed under the conveyor belt;
   f. means for non-tiltably raising bread slices into tangent contact relation with the surface of the applicator cylinder for wiping the upper surface of the bread against the protruding spreadable material thereby to effect a uniform spreading of the spreadable material on the surface of the bread.

5. An apparatus, as defined in claim 4, wherein:
   a. the width of the perforated zone of the applicator cylinder is less than the width of each bread slice, whereby the side margins of each bread slice passing the applicator cylinder remains uncoated;
   b. the means for raising the bread slices effects initial contact of a bread slice with the applicator cylinder inwardly of the leading edge of the bread slice passing the applicator cylinder, and terminates contact prior to the trailing edge passing the applicator cylinder whereby the leading and trailing margins of the bread slice remain uncoated.

6. An apparatus, as defined in claim 5, wherein:
   a. a doctor blade severs the spreadable material protruding from the applicator cylinder in a region following the slotted portion of the sleeve to predetermine the thickness of the remaining spreadable material applied to the bread slices;
   b. and means is provided to remove the severed spreadable material from the doctor blade for reuse.

* * * * *